United States Patent
Da Silva et al.

(10) Patent No.: US 11,762,446 B2
(45) Date of Patent: Sep. 19, 2023

(54) METHOD AND SYSTEM FOR ENERGY AWARE SCHEDULING FOR SENSORS

(71) Applicant: The Provost, Fellows, Foundation Scholars and the other members of Board, of the College of the Holy, Dublin (IE)

(72) Inventors: Luiz Da Silva, Dublin (IE); Jernej Hribar, Dublin (IE)

(73) Assignee: The Provost, Fellows, Foundation Scholars and the other members of Board, of the College of the Holy and Undivided Trinity of Queen Elizabeth near Dublin, Dublin (IE)

( * ) Notice: Subject to any disclaimer, the term of this patent is extended or adjusted under 35 U.S.C. 154(b) by 230 days.

(21) Appl. No.: 17/129,284

(22) Filed: Dec. 21, 2020

(65) Prior Publication Data

US 2021/0191495 A1 Jun. 24, 2021

Related U.S. Application Data

(60) Provisional application No. 62/951,093, filed on Dec. 20, 2019.

(51) Int. Cl.
| | | |
|---|---|---|
| *G06F 1/00* | (2006.01) | |
| *G06F 1/3212* | (2019.01) | |
| *G06N 3/08* | (2023.01) | |
| *G06N 3/04* | (2023.01) | |
| *H04W 84/18* | (2009.01) | |

(52) U.S. Cl.
CPC ............. *G06F 1/3212* (2013.01); *G06N 3/04* (2013.01); *G06N 3/08* (2013.01); *H04W 84/18* (2013.01)

(58) Field of Classification Search
CPC .......... G06F 1/3212; G06N 3/04; G06N 3/08; G06N 3/0454; G06N 3/082; G06N 7/005; G06N 3/006; H04W 84/18; Y02D 10/00; Y02D 30/70
See application file for complete search history.

(56) References Cited

U.S. PATENT DOCUMENTS

| | | | |
|---|---|---|---|
| 9,220,069 B2* | 12/2015 | Krishnaswamy | ............................ H04W 52/0261 |
| 11,416,941 B1* | 8/2022 | Allen | ...................... G06Q 40/08 |
| 2003/0144020 A1* | 7/2003 | Challa | ............... H04W 56/0035 455/69 |

(Continued)

OTHER PUBLICATIONS

Noel Cressie & Hsin-Cheng Huang; "Classes of Nonseparable, Spatio-Temporal Stationary Covariance Functions", Journal of the American Statistical Association, 94:448, 1330-1339, DOI: 10.1080/01621459.1999.10473885 (1999).

(Continued)

*Primary Examiner* — Xuxing Chen
(74) *Attorney, Agent, or Firm* — ARC IP LAW, PC; Joseph J. Mayo

(57) ABSTRACT

The present invention relates to a method and system energy aware scheduling for sensors (Internet of Things (IoT)). More specifically, the method and system relates to energy scheduling of battery powered sensors or sensors powered using energy harvesters such that accurate and up to date information may be received from said sensors and at the same time minimizing the power utilized by said battery powered or energy harvester powered sensors.

10 Claims, 5 Drawing Sheets

(56) References Cited

U.S. PATENT DOCUMENTS

| | | | | |
|---|---|---|---|---|
| 2010/0127836 A1* | 5/2010 | Huang | ................ | G01P 3/64 |
| | | | | 340/10.5 |
| 2015/0233730 A1* | 8/2015 | Guillet | ................ | G01D 3/08 |
| | | | | 701/3 |
| 2015/0377690 A1* | 12/2015 | Phelan | ................ | G01F 25/10 |
| | | | | 73/1.34 |
| 2016/0201932 A1* | 7/2016 | Endo | ................ | F24F 11/46 |
| | | | | 236/51 |
| 2017/0210401 A1* | 7/2017 | Mian | ................ | B61L 15/0072 |
| 2018/0279221 A1* | 9/2018 | Fuleshwar Prasad | ................ | |
| | | | | H04W 52/0254 |

OTHER PUBLICATIONS

T. Gneiting, "Nonseparable, stationary covariance functions for space-time data," Journal of the American Statistical Association, vol. 97, No. 458, pp. 590-600 (2002).

\* cited by examiner

METHOD AND SYSTEM FOR ENERGY AWARE SCHEDULING FOR SENSORS

The application claims the benefit of U.S. Provisional Patent Application No. 62/951,093, filed 20 Dec. 2019, the specification of which is hereby incorporated herein by reference.

BACKGROUND OF THE INVENTION

Field of the Invention

The present disclosure relates to a method and system energy aware scheduling for sensors (Internet of Things (IoT)).

Description of Related Art

Billions of low-power devices are being deployed to provide services in smart cities, industries, smart agriculture systems, and other Internet of Things (IoT) applications. Many of these devices are low-cost sensors powered by non-rechargeable batteries and/or energy harvesting devices. Their role is to provide sensed information to systems, which use this information to make decisions. For example, in smart agriculture, a system controlling an irrigation system requires information from various sensors to decide which fields to water. The main challenge is to provide accurate and up-to-date information to services while keeping the battery-powered devices functional for as long as possible.

For improving the energy efficiency of low-power sensor devices was first investigated in the context of Wireless Sensor Networks (WSNs). Such approaches rely on data prediction or model-based active sampling methods, in which sensors use carefully designed mathematical models to predict when the system requires updates to maintain the accuracy of reported information regarding the observed phenomenon. Recently a few techniques relying on correlated information to preserve energy were proposed which clusters sensors based on their spatial and temporal correlation. Each time an update is required a different sensor in a cluster transmits it, thus preserving energy and simultaneously maintaining real-time reporting. Similarly, known scheduling techniques exist of group sensors, based on their physical locations, to preserve energy. In both of the above techniques, the mesh network type being efficient at clustering and routing can result in significant energy savings. However, low-power sensor devices are constrained in terms of available computing power, memory, communication capabilities, and energy. Limited processing power and memory prevent the use of a sophisticated algorithm (complex mathematical models) on the sensor itself. Additionally, these sensors rely on low data rate transmission, meaning that communication messages between sensors should be kept to a minimum. Furthermore, sensors may rely on different power sources such as event-based energy harvesting, a battery that is periodically recharged or replaced, a non-rechargeable primary battery. Thus, such sensor devices are required to be energy efficient to extend duration of functioning of said sensor devices or the lifetime of said sensor devices.

However, recent trends for low-power devices indicate that devices will rely on Low Power Wireless Access Networks standards. In such a case, the network has a star topology and solutions presented above have limited applicability. To extend their lifetime, low-power sensors rely on the use of sleep mode. When a sensor is in sleep mode, the rest of the network cannot communicate with it. Consequently, the gateway has to inform each sensor, while the sensor is still in active mode, when it should wake up again and transmit the next observation. Sleep mode is supported by most Low-Power Wide-Area Network (LPWAN) standards, such as SigFox, Weightless, Long Range Wide Area Network (LoRaWAN), and Narrowband IoT (NB-IoT). The low-power sensor is usually in active mode only after it has transmitted. For example, a sensor using a LoRaWAN class A radio will listen for two short time-windows after it has transmitted, as illustrated in the LoRaWAN message sequence in FIG. 1.

Therefore, there is an unresolved an unfulfilled need for a method and system which is applicable to battery powered or energy harvester powered sensors connected in a star topology.

Further, there is an unresolved and unfulfilled need for receiving accurate and up to date information from said battery powered or energy harvester powered sensors and at the same time minimizing the power utilized by said battery powered or energy harvester powered sensors.

BRIEF SUMMARY OF THE INVENTION

The present invention relates to a method and system energy aware scheduling for sensors (Internet of Things (IoT)), as set out in the appended claims. More specifically, the method and system relates to energy scheduling of battery powered sensors or sensors powered using energy harvesters such that accurate and up to date information may be received from said sensors and at the same time minimizing the power utilized by said battery powered or energy harvester powered sensors.

In one embodiment there is provided a method for energy aware scheduling for sensor devices, comprising: receiving one or more data packets from a first sensor device among said sensor devices, said sensor devices located in proximity of a location of interest, said one or more data packets comprising sensor data, said sensor data comprising sensor readings and energy available on said first sensor device; transmitting a first sleep duration to said first sensor device, wherein said first sleep duration is based on the time of receipt of said data packets from said first sensor device, a first estimation or measured error and energy available on said first sensor device; and transmitting a second sleep duration to a second sensor device among said sensor devices.

The first estimation or measured error is based on said received sensor reading from said first sensor device and one or more previously received sensor reading from said sensor devices.

The method further comprises receiving one or more data packets comprising sensor data from said second sensor device, said sensor data comprising sensor readings and energy available on said second sensor device. The second sleep duration is based on the time of receipt of said data packets from said second sensor device, a second estimation or measured error and energy available on said second sensor device. The second estimation or measured error is based on said received sensor reading from said second sensor device and one or more previously received sensor reading from said sensor devices including said first sensor device.

The first sleep duration and second sleep duration is determined by an artificial neural network trained using a deep reinforcement learning technique, and wherein said artificial neural network determines said first sleep duration and said second sleep duration such that the first and second estimation or measured error does not exceed a predetermined threshold and the energy utilized by said first sensor device and said second sensor device is minimized and wherein said first sleep duration is greater than said second sleep duration and energy available on said second sensor device is greater that the energy available on the first sensor device.

The system for energy aware scheduling for sensor devices, comprising a transceiver operatively coupled to a processor. The processor is configured for receiving one or more data packets from a first sensor device among said sensor devices, said sensor devices located in proximity of a location of interest, said one or more data packets comprising sensor data, said sensor data comprising sensor readings and energy available on said first sensor device; transmitting a first sleep duration to said first sensor device, wherein said first sleep duration is based on the time of receipt of said data packets from said first sensor device, an estimation or measured error and energy available on said first sensor device; and transmitting a second sleep duration to a second sensor device among said sensor devices.

The estimation or measured error is based on said received sensor reading from said first sensor device and one or more previously received sensor reading from said sensor devices.

The processor is further configured for receiving one or more data packets comprising sensor data from said second sensor device, said sensor data comprising sensor readings and energy available on said second sensor device. The, second sleep duration is based on the time of receipt of said data packets from said second sensor device, an estimation or measured error and energy available on said second sensor device.

The estimation or measured error is based on said received sensor reading from said second sensor device and one or more previously received sensor reading from said sensor devices including said first sensor device.

The first sleep duration and second sleep duration is determined by an artificial neural network implemented by said processor, said artificial neural network trained using a deep reinforcement learning technique, and wherein said artificial neural network determines said first sleep duration and said second sleep duration such that the estimation or measured error does not exceed a predetermined threshold and the energy utilized by said sensor devices is minimized and wherein said first sleep duration is greater than said second sleep duration and energy available on said second sensor device is greater that the energy available on the first sensor device.

BRIEF DESCRIPTION OF THE DRAWINGS

The invention will be more clearly understood from the following description of an embodiment thereof, given by way of example only, with reference to the accompanying drawings, in which.

DETAILED DESCRIPTION OF THE DRAWINGS

The present invention relates to a method and system energy aware scheduling for sensors (Internet of Things (IoT)). More specifically, the method and system relates to energy scheduling of battery powered sensors or sensors powered using energy harvesters such that accurate and up to date information may be received from said sensors and at the same time minimizing the power utilized by said battery powered or energy harvester powered sensors.

Figure 1:
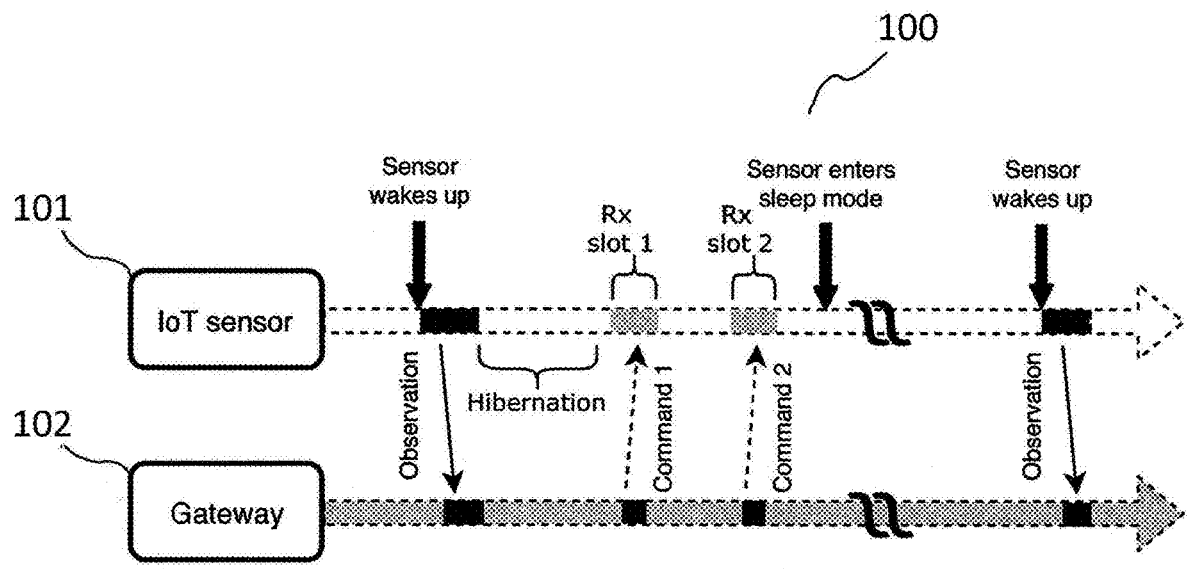
FIG. 1 exemplarily illustrates a timeline of exchange of message between a LoRaWAN network gateway and an IoT sensor.

FIG. 1 exemplarily illustrates a sensor network 100. Said sensor network comprises N randomly distributed sensor devices 101, denoted by $\{S_1, \ldots, S_N\}$, observing a physical phenomenon $Z(x, t)$ distributed in space x and evolving in time t. Each sensor 101 can communicate with a gateway 102. The sensors 101 are deployed at positions $x_n$ and transmit periodic observations (one or more data packets comprising sensor readings) with an update rate $\lambda_n$, $n=1, \ldots, N$. Whenever the system receives an observation from location $x_n$ at time t, the system anticipates the arrival of the next observation from location $x_n$ at time instance $t=t_n+1/\lambda_n$. Such observations are stored into a vector $Y=[Y_1, \ldots, Y_N]T$ with $Y_n=Z(x_n, t_n)$ where $t_n \in [0, t]$ is the latest time at which a sensor device n has reported (transmitted) an observation.

Figure 2:
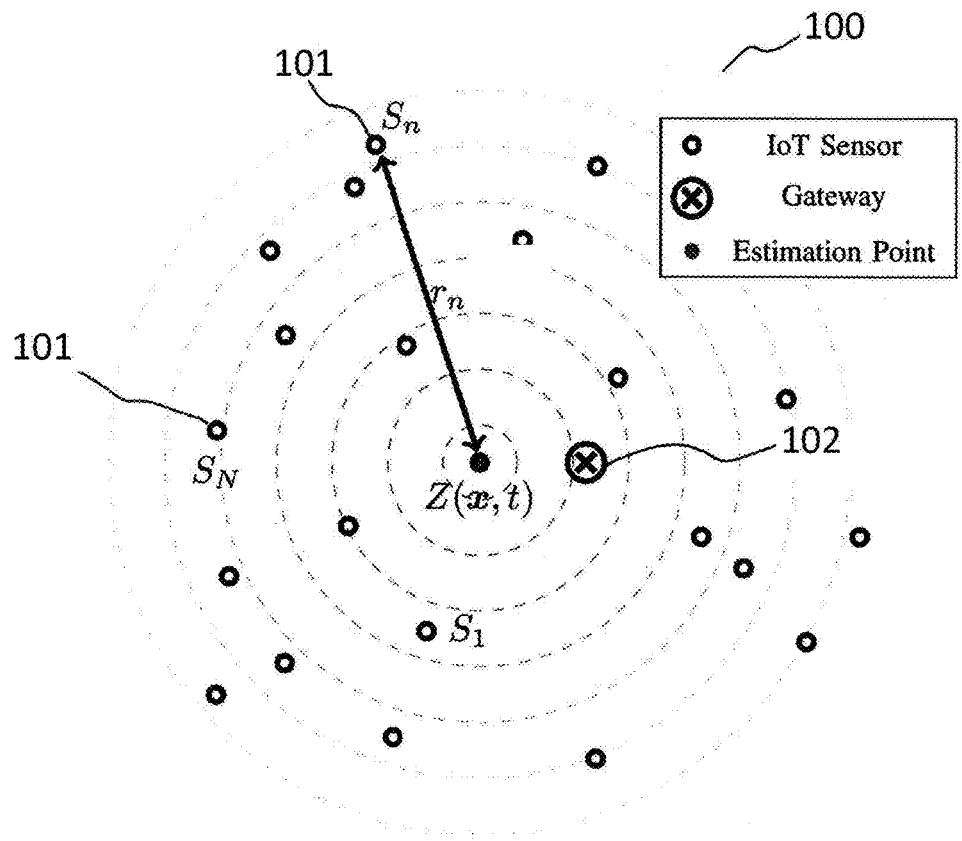
FIG. 2 exemplarily illustrates a system of N randomly distributed sensor nodes, whose observations (sensor readings) are used to estimate the value of an observed physical phenomenon in accordance with some of the embodiments of the present invention.

The system estimates the value of the observed physical phenomenon (from the sensor readings) at the desired location x at any time instance t using collected information as presented in FIG. 2. The Euclidean distance between sensor $S_n$ and the location of interest x as $r_n$ is determined. $\Delta_n(t)$ is the time elapsed since the system received the latest observation from sensor device $S_n$, i.e., the AoI, $\Delta n(t):=t-t_n$. Using every available observation, a simple Linear Minimum Mean Square Error (LMMSE) estimator is applied and an approximate the value of the observed physical phenomenon at position x at time instance t is obtained as:

$$\hat{Z}(x, t) = \omega_0 + \sum_{n=1}^{N} \omega_n Y_n, \quad (1)$$

where $\omega_n$, $n=0, \ldots N$ are LMMSE estimator weights. The LMMSE estimator weight vector $\omega=[\omega_0, \ldots, \omega_N]^T$ is as follows:

$$\omega=(C_{YY})^{-1}c_{YZ}. \quad (2)$$

The matrices $C_{YY}$, $c_{YZ}$ are covariance matrices, required to determine ω:

$$C_{YY} = \begin{bmatrix} \sigma_{Y_1 Y_1} & \cdots & \sigma_{Y_1 Y_N} \\ \vdots & & \vdots \\ \sigma_{Y_N Y_1} & \cdots & \sigma_{Y_N Y_N} \end{bmatrix}; c_{YZ} = \begin{bmatrix} \sigma_{Y_1 Z} \\ \vdots \\ \sigma_{Y_N Z} \end{bmatrix}; \quad (3)$$

in which $\sigma_{Y_i Y_j}$; i,j=1, . . . , N is the covariance of observations $Y_i$ and $Y_j$, and $\sigma_{Y_i Z}$ is the covariance of $Y_i$ and Z.

In an embodiment, a separable covariance model defined in Noel Cressie & Hsin-Cheng Huang (1999) Classes of Nonseparable, Spatio-Temporal Stationary Covariance Functions, Journal of the American Statistical Association, 94:448, 1330-1339, DOI: 10.1080/01621459.1999.10473885 is applied. Using the above covariance model a relation between the observations collected at different instants in time and different locations is obtained.

The selected covariance function provides a good fit to model spatial and temporal variation for many physical phenomena. In particular, it can be applied to a system observing temperature or humidity. Additionally, the selected covariance model provides a mathematically tractable model for spatial-temporal variation of gathered observations. The covariance between two observations with time difference $\Delta_n(t)$ at locations a distance $r_n$ apart is represented as:

$$C(r_n, t|\theta_1(t), \theta_2(t)) = \exp(-\theta_2(t) r_n - \theta_1(t) \Delta_n(t)). \quad (4)$$

where $\theta_1(t)$ and $\theta_2(t)$ are scaling parameters of time and space, respectively. Both parameters change over time and are extracted from the obtained observations. In an embodiment, a scaling extraction method with Pearson's correlation coefficient formula for samples is used for obtaining said scaling parameters, as described in T. Gneiting, "Nonseparable, stationary covariance functions for space-time data," Journal of the American Statistical Association, vol. 97, no. 458, pp. 590-600, 2002.

Thereafter, by employing Eq. (1), an estimate of the value of the observed physical phenomenon may determined. Additionally, matrices $C_{YY}$ and $c_{YZ}$ may be used to determine the Mean Square Error (MSE) in the estimation as:

$$\varepsilon(x, t|\theta_1(t), \theta_2(t)) = \sigma_z^2 - c_{ZY} \omega, \quad (5)$$

where $c_{ZY}$ is the transpose of $c_{YZ}$ defined above.

The estimation error provides a measure with which the updating mechanism can quantify the quality of the information currently provided by the sensing process: the lower the value of the estimation error, the more accurate the estimated values and the lower the need for an additional update. Hence, by measuring the estimation error between two consecutive updates (received from said sensor devices) the system assesses how accurate and up-to-date the observations must be. By setting the value of estimation error threshold, i.e., $\varepsilon^*$, a goal is set for the updating mechanism on how accurate the collection should be. In short, the goal of the updating mechanism is to set sensors' transmission times in such a way that the estimation error will not exceed the set target $\varepsilon^*$, while also considering the sensors' available energy and aiming to maximise the lifetime of the network.

The main goal of the updating mechanism is to prolong the network lifetime, defined as the time until the first battery-powered sensor consumes all of its available energy. Each sensor's lifetime depends on the frequency of transmitted observations, i.e., the time between two consecutive updates, and on the continuous power consumption, i.e., the minimal power that sensors always require to function. The sensor's lifetime $L_n$ may be represented as $$\mathbb{E}[\mathcal{L}_n] = \frac{E_0}{P_n}, \quad (6)$$

where $E_0$ represents the sensors' starting energy and $P_n$ is sensor's power consumption, defined as:

$$P_n = P_c + \frac{\mathbb{E}[E_{tr}]}{T_n}. \quad (7)$$

where $P_c$ is the continuous power consumption, $T_n$ denotes the time between two consecutive updates, and $\mathbb{E}[E_{tr}]$ represents the expected energy required to acquire and transmit an observation (sensor readings) by the sensor device. The continuous power consumption is the power which the sensor requires to function regardless of mode of operation and depends solely on the sensor hardware components. For low-power IoT sensors, $P_c$ is in range of a few μW or less. The energy required to transmit the observation, i.e., $\mathbb{E}[E_{tr}]$, depends on many factors such as the size of transmitted data packet(s), the energy required to take the measurement (sensor readings), and channel conditions of the wireless network through which said sensor devices are connected to the system.

To prolong the lifetime of the network, the system minimises transmissions by all sensors, i.e., increase $T_n$, and, when updates are required, favour sensors with higher remaining energy, all while keeping the estimation error of the observed physical phenomenon at every location of interest close to the pre-specified value.

Every sensor location, i.e., $x_n$, may be considered to be a location of interest, meaning that system has to make accurate estimations at the location of every sensor while keeping sensors' power consumption to a minimum.

Figure 3:
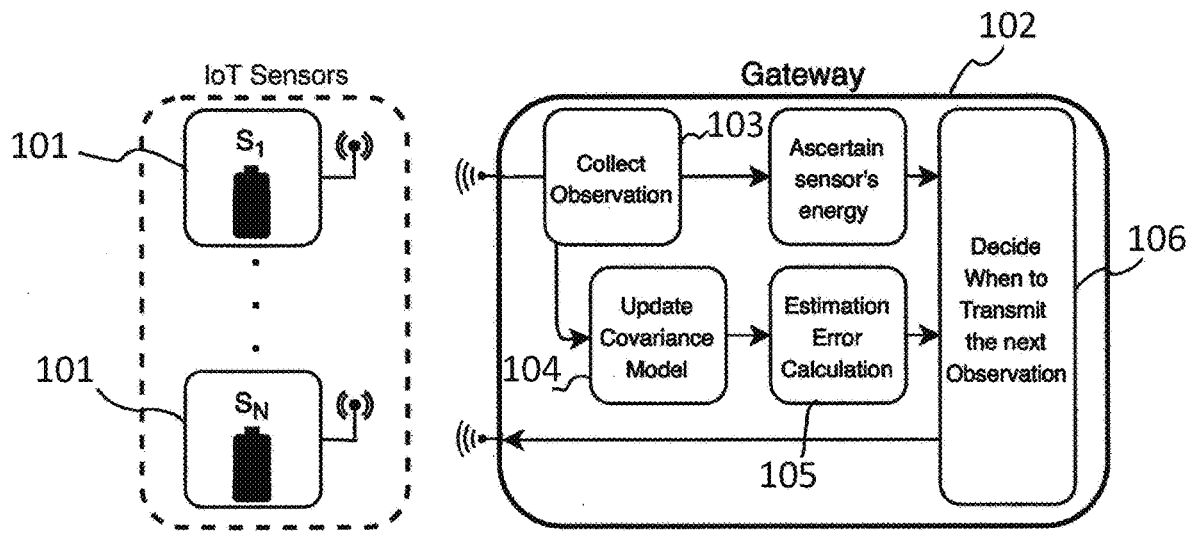
FIG. 3 exemplarily illustrates a high level overview of the decision making process in the system in accordance with some of the embodiments of the present invention.

The decision-making process implemented by the gateway or system 102 is illustrated in FIG. 3. The system 102 decides on each sensor's 101 next update time (sleep time) by evaluating the timeliness of updates, the accuracy of collected observation i.e the estimation error and the sensors' available energy. The sensors' 101 available energy can be determined from the sensor's reported power supply measurement. The system can then make the decision of when the sensor 101 should transmit its next observation. To make the decision, a Reinforcement Learning (RL) based technique is applied as discussed in the subsequent paragraphs.

Each received observation by the module 103 impacts the co-variance model's 104 scaling parameters. As a result, the value of MSE continuously varies over time calculated by module 105. These changes are application-specific: for example, in a smart factory, environmental changes are persistent due to many factory processes simultaneously impacting the observed environment. In contrast, the changes in a smart farming scenario tend to be much more gradual. The updating mechanism 106 of the system has to anticipate such changes, and by employing RL, the updating mechanism to learns how to set IoT sensors' transmission times (transmission intervals or sleep time) to near-optimal values in the presence of the ever-changing environment. The subsequent paragraphs discloses modelling the decision making using an RL solution, and describes the relevant states, actions, and rewards. Thereafter, by applying a Deep Deterministic Policy Gradient (DDPG) algorithm, is applied to arrive at a long-term updating policy to collect accurate observations and prolong the network lifetime.

In RL, the agent learns its optimal behaviour, i.e., a set of actions to take in every state, from interactions with the environment. In the present invention, a learning agent 110 (artificial neural network) resides in the system. The learning agent 110 interacts with the environment by setting sensors' update times, and through the MSE it can assess the impacts of those decisions. Additionally, the remaining energy available on each low-power sensor and their latest update time aid the learning agent's decision-making process.

Figure 4:
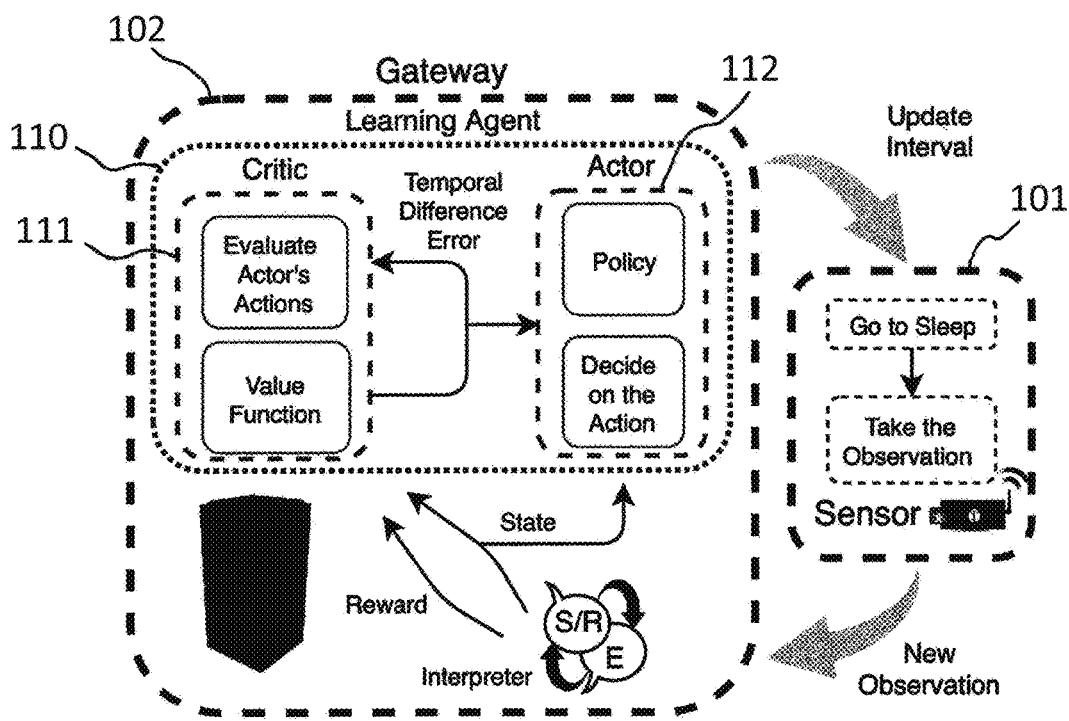
FIG. 4 exemplarily illustrates a high level overview of the proposed scheduling mechanism implemented with Deterministic Policy Gradient Algorithm in accordance with some of the embodiments of the present invention.

In an embodiment a DDPG algorithm is used as illustrated in FIG. 4. The DDPG algorithm comprises two or more neural networks, where an actor neural network 112 determines the update times or sleep times for each sensor device in the network and a critic neural network 111 provides a feedback to said actor neural network based on the actions of said actor neural network 112. In the present invention, the system performs every computationally demanding task i.e. inter alia implementation of said DDPG algorithm. The low-power sensor devices only receives a command message that instructs the sensor for how long it should enter sleep mode. By setting the duration of each sensor's sleep mode, the system effectively schedules the sensors' transmission of updates. In an embodiment the actor's actions are limited to increasing and decreasing the sleep time, or equivalently the sensor's update time $T_n$, and the critic's role is to evaluate whether the selected change meets the objectives i.e. extending the lifetime of the sensor network while maintaining accuracy. The critic derives a value representing the quality of the selected action using the reward function for the actor. The actor then uses the provided quality of action value to adapt its policy accordingly.

The states, actions, and reward functions, may be defined a tuple i.e. <S, A, R> that enables the system to determine each sensor's optimal update times.

For each sensor, the state $s_n \in S$ must capture three critical aspects of the decision-making process in the gateway: a sensor's current update time or time of receipt of data packets comprising sensor readings, its available energy, and the value of estimation error.

Whenever sensor n transmits an observation, the system stores the information regarding the sensor's update time, $T_n$, available energy, $E_n$, and the value of the average MSE since the last transmission, $\bar{\varepsilon}_n$. The inclusion of these three pieces of information from every sensor results in an overly complex state space: therefore a geometric mean is used to compress the number of state inputs. The state $s_n$ can be expressed as a six-dimensional vector:

$$s_n = \left(T_n, E_n, \frac{\bar{\varepsilon}_n}{\varepsilon^*}, \left(\prod_{\substack{i=1 \\ i \neq n}}^{N} T_i\right)^{\frac{1}{N-1}}, \left(\prod_{\substack{i=1 \\ i \neq n}}^{N} E_i\right)^{\frac{1}{N-1}}, \left(\prod_{\substack{i=1 \\ i \neq n}}^{N} \frac{\bar{\varepsilon}_i}{\varepsilon^*}\right)^{\frac{1}{N-1}}\right) \quad (8)$$

with N representing the total number of sensors under the system's control. The learning agent always interprets states from the perspective of the sensor that has transmitted an observation, and for which it is making the decision. The first three inputs correspond to the transmitting sensor's update time, available energy, and the ratio between average MSE and target estimation error. Relying on the ratio enables the learning agent to perform well even if the target estimation error changes. Using the geometric mean enables the number of state inputs, while simultaneously making sure the learning agent captures the most significant information about the environment. For example, the geometric mean provides information to the agent regarding whether the energy level in the majority of the sensors is low or high.

The learning agent's 110 action is limited to either increasing or decreasing the sensors' current update interval. The DDPG algorithm returns a continuous value and in an embodiment, the returned action value ($a_n \in A$) is between $-1$ and $1$, i.e., $A=[-1, 1]$. To determine the sensors' new update interval, the received action value is multiplied by a constant, i.e. maximum update interval change $U_{max}$. The new update interval is determined by:

$$T_n = T'_n + U_{max} a_n, \quad (9)$$

where $T'_n$ is the sensors' current update time. A person skilled in the art would appreciate that the value of Umar can be relatively large, e.g., hundreds of seconds. The reward function is selected with the learning agent's main goal in mind where the learning agent ensures that information collection is frequent enough to maintain the freshness of the information and simultaneously try to prolong the sensors' lifetime. Thus, the reward function is represented as:

$$R(s_n) = \phi R_{acc}(s_n) + (1-\phi) R_{en}(S_n). \quad (10)$$

$R_{acc}(s_n)$ is the reward for accurate collection of observations and $R_{en}(S_n)$ is the reward related to the energy aspect of the problem. The weight $\varphi \in [0, 1]$ controls the balance between the reward for accurate collection of observations and the sensors' energy preservation, respectively. The accuracy reward depends on whether the set average accuracy, varepsilon*, was satisfied since the n-th sensor's last transmission and the change in the estimation error since the last transmission. The accuracy reward is defined as:

$$R_{acc}(s_n) = \begin{cases} \text{when } \bar{\varepsilon}_n \leq \varepsilon^*: \\ \left(\frac{\bar{\varepsilon}_n}{\varepsilon^*}\right)^2 + f(\Delta \bar{\varepsilon}_n) \\ \text{when } \bar{\varepsilon}_n > \varepsilon^*: \\ \left(\frac{\bar{\varepsilon}_n - \varepsilon^*}{\varepsilon^*}\right)^2 - f(\Delta \bar{\varepsilon}_n) \end{cases} \quad (11)$$

where:

$$f(\Delta \bar{\varepsilon}_n) = \begin{cases} 1, & \text{if } \Upsilon \Delta \bar{\varepsilon}_n > 1 \\ \Upsilon \Delta \bar{\varepsilon}_n & \text{if } 1 < \Upsilon \Delta \bar{\varepsilon}_n < 1 \\ -1, & \text{if } \Upsilon \Delta \bar{\varepsilon}_n < -1 \end{cases}$$

where $\Delta \bar{\varepsilon}_n$, represents the change in the estimation error since the previous transmission. The closer the estimation error is to the target, the greater is the reward from the first term of the function. The second term of the accuracy reward steers the learning agent towards keeping the average MSE as close as possible to the set $\varepsilon^*$, without exceeding it. The factor $\gamma$ is used to balance the contributions of the two terms of the accuracy reward function.

The energy reward function exploits the relationship between the update time and a battery-powered sensor's lifetime. The longer the time between the consecutive updates, the longer will be the sensors' lifetime. Therefore, the selected energy reward is based on how update time is increased or decreased, as follows:

$$R_{en}(s_n) = \begin{cases} 1 - \dfrac{NE_n}{\sum_{i=1}^{N} E_i}, & \text{if } T_n > T'_n \\ 0, & \text{if } T_n = T'_n, \\ \dfrac{NE_n}{\sum_{i=1}^{N} E_i} - 1, & \text{if } T_n < T'_n \end{cases} \quad (12)$$

where $E_n$ is the sensor's available energy. If a sensor has above average available energy, the energy reward encourages the learning agent to make sure that such a sensor updates more often, and vice-versa if a sensor has below average energy.

Figure 5:
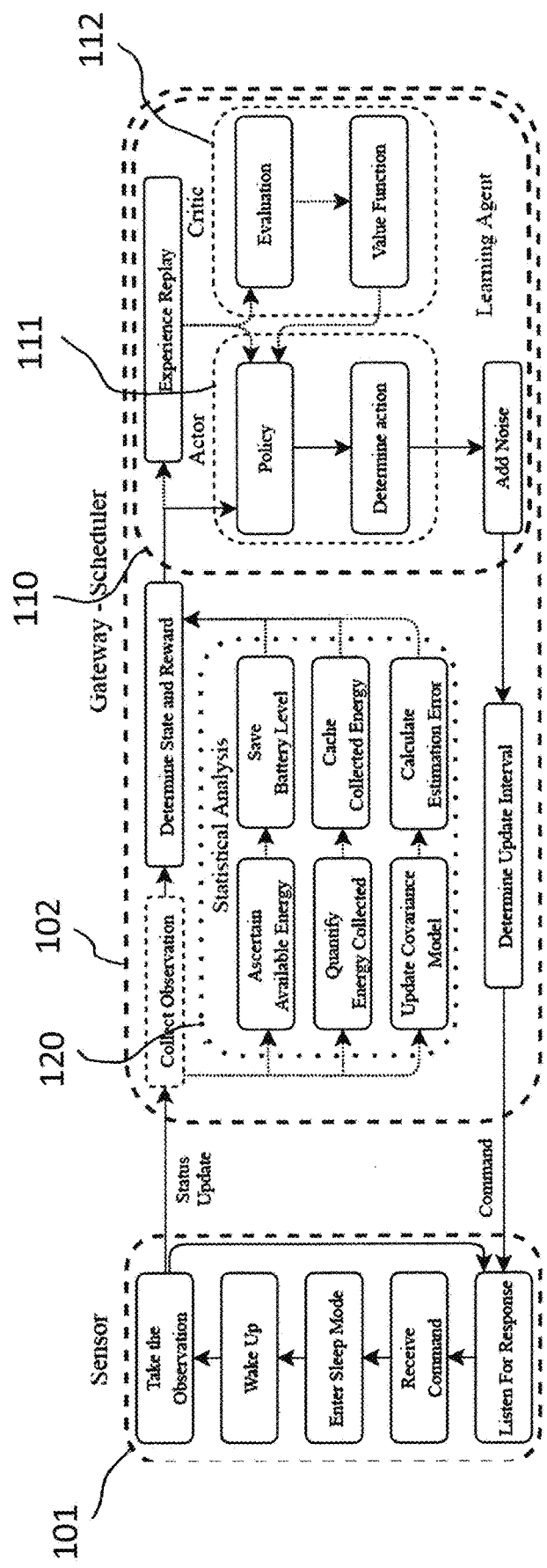
FIG. 5 illustrates a more detailed view of the scheduler implemented in a gateway according to another embodiment of the invention.

FIG. 5 illustrates a more detailed view of the scheduler implemented in a gateway 102 and similar in operation to FIG. 4. In FIG. 5 the scheduler, implemented in the gateway, comprises of two main parts: a statistical analysis module 120 and the learning agent 110. The statistical module 120 is configured to analyze and store information relevant to the scheduling process. The gateway 102 analyses and stores information regarding the one or more sensor battery level, amount of energy collected, the estimation error, etc. The statistical analysis can be carried out in parallel with other processes in the gateway. The stored information enables the gateway to quickly determine the state and reward when a sensor transmits. The state information is then passed to the learning agent 110 to decide on the action. The Learning Agent 110 is, in this embodiment, implemented with the DDPG algorithm as described in the above paragraphs with respect to FIG. 4.

Figure 6:
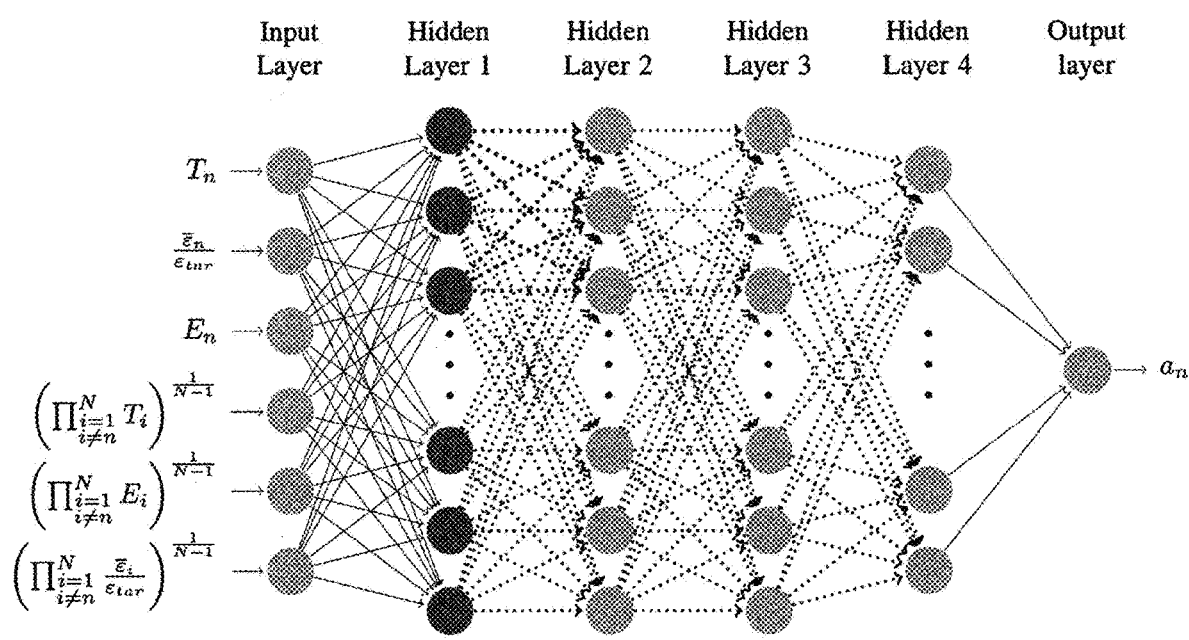
FIG. 6 exemplarily illustrates an artificial neural network implementing the actor agent in accordance with some of the embodiments of the present invention.

The subsequent paragraphs discloses the implementation of the DDPG algorithm. The actor and the critic may be implemented using similar artificial neural network (ANN) structures. The actor's ANN consists of an input layer (state inputs), output layer (action value), and four feed-forward hidden layers, as shown in FIG. 6. In an embodiment 75 neurons are used in the first three hidden layers and 25 neurons is used in the fourth layer. Between each hidden layer, a 50% dropout layer is implemented. Batch normalization is used after activation in the first hidden layer. The dropout layers prevent over-fitting, and batch normalization improves learning speed. The same structure is employed for the critic's ANN, with a slight difference in the activation function used. Relu activation function is used for every layer in both ANNs. The only exception is the output layer of the actor's ANN, where we a Hyperbolic function is used as an activation function. To train the ANNs batch learning is performed periodically. In each batch training 128 experiences are used. Each experience consists of a state, corresponding action and reward, and the state to which the sensor transits after taking the selected action. In an embodiment 128 experiences are randomly selected from a memory pool of up to 100,000 experiences.

An episode starts when a sensor 101 transmits an observation. Thereafter, when the system receives the observation, it uses the interpreter to determine the sensor's state and calculates reward for the action taken, i.e., the change of update time. The sensor state information is then passed to the learning agent 110 to determine the new action; the learning agent 110 calculates the sensor's new update time and informs the sensor. The sensor enters sleep mode for the amount of time determined by the learning agent. As soon as the sensor wakes up, the episode ends, and the new episode starts as the sensor transmits a new update. Exploration in DDPG algorithms is performed by adding noise, i.e. a random value, to the actor's output value. In an embodiment, the Ornstein-Uhlenbeck process is used to generate a random value to be added to the selected action value.

In a typical embodiment, the learning agent is capable of responding within 2 to 3 ms, thus satisfying the timing constraints set by sensors' communications technology. For example, a sensor using LoRaWAN radio typically enters hibernation mode for more than a second. Additionally, response messages from the agent impose no additional energy cost to the sensor, as most LPWAN standards require the sensor to listen to the communication channel after its transmission.

In an embodiment, the method for energy aware scheduling for sensor devices 101, comprises: receiving one or more data packets from a first sensor device among said sensor devices, said sensor devices located in proximity of a location of interest, said one or more data packets comprising sensor data, said sensor data comprising sensor readings and energy available on said first sensor device; transmitting a first sleep duration to said first sensor device, wherein said first sleep duration is based on the time of receipt of said data packets from said first sensor device, a first estimation error and energy available on said first sensor device; and transmitting a second sleep duration to a second sensor device among said sensor devices.

The first estimation error is based on said received sensor reading from said first sensor device and one or more previously received sensor reading from said sensor devices.

The method further comprises receiving one or more data packets comprising sensor data from said second sensor device, said sensor data comprising sensor readings and energy available on said second sensor device. The second sleep duration is based on the time of receipt of said data packets from said second sensor device, a second estimation error and energy available on said second sensor device. The second estimation error is based on said received sensor reading from said second sensor device and one or more previously received sensor reading from said sensor devices including said first sensor device.

The first sleep duration and second sleep duration is determined by an artificial neural network trained using a deep reinforcement learning technique, and wherein said artificial neural network determines said first sleep duration and said second sleep duration such that the first and second estimation error does not exceed a predetermined threshold and the energy utilized by said first sensor device and said second sensor device is minimized and wherein said first sleep duration is greater than said second sleep duration and energy available on said second sensor device is greater that the energy available on the first sensor device.

In an embodiment, the system for energy aware scheduling for sensor devices, comprising a transceiver operatively coupled to a processor. The processor is configured for receiving one or more data packets from a first sensor device among said sensor devices, said sensor devices located in proximity of a location of interest, said one or more data packets comprising sensor data, said sensor data comprising sensor readings and energy available on said first sensor device; transmitting a first sleep duration to said first sensor device, wherein said first sleep duration is based on the time of receipt of said data packets from said first sensor device, an estimation error and energy available on said first sensor device; and transmitting a second sleep duration to a second sensor device among said sensor devices.

The estimation error is based on said received sensor reading from said first sensor device and one or more previously received sensor reading from said sensor devices.

It will be appreciated that the first estimation error and the second estimation error can be calculated or measured in a number of ways. For example, the estimation error is a variance determined using Gaussian Processes (GP). GP enables an efficient correlation of sensor information particularly within specific geographical areas and hence provides accurate estimations. Further, metadata can also be leveraged to better describe correlation between sensors information.

The processor is further configured for receiving one or more data packets comprising sensor data from said second sensor device, said sensor data comprising sensor readings and energy available on said second sensor device. The, second sleep duration is based on the time of receipt of said data packets from said second sensor device, an estimation error and energy available on said second sensor device.

The estimation error is based on said received sensor reading from said second sensor device and one or more previously received sensor reading from said sensor devices including said first sensor device.

The first sleep duration and second sleep duration is determined by an artificial neural network implemented by said processor, said artificial neural network trained using a deep reinforcement learning technique, and wherein said artificial neural network determines said first sleep duration and said second sleep duration such that the estimation error does not exceed a predetermined threshold and the energy utilized by said sensor devices is minimized and wherein said first sleep duration is greater than said second sleep duration and energy available on said second sensor device is greater that the energy available on the first sensor device.

Figure 7:
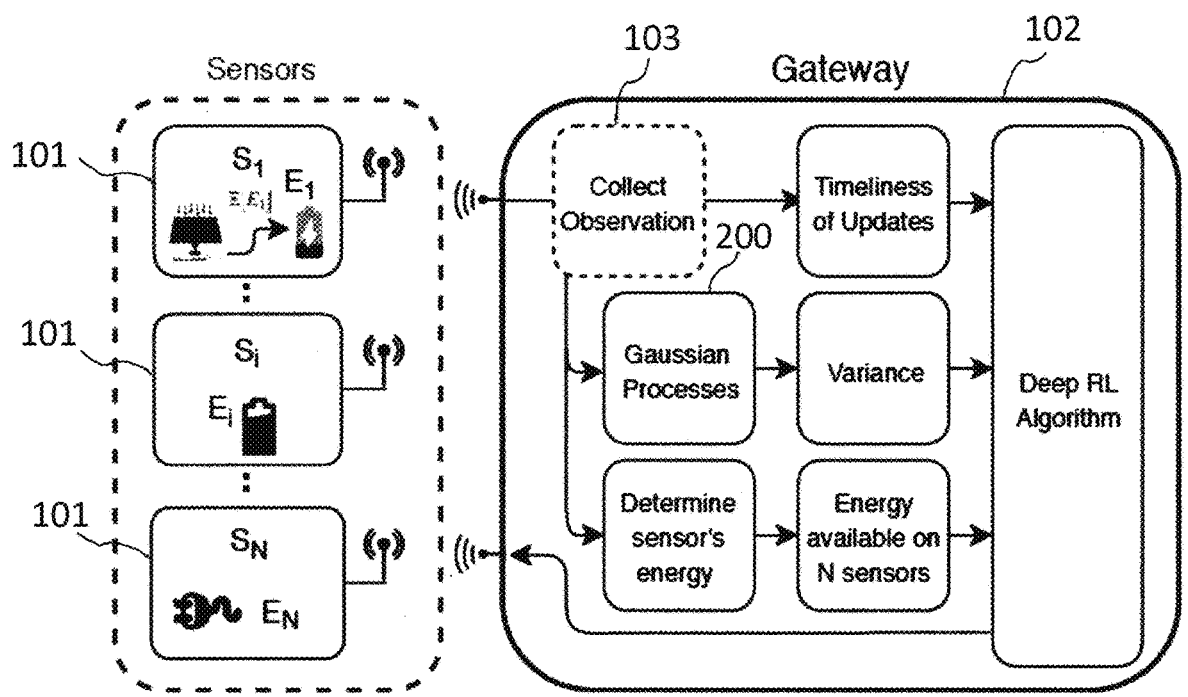
FIG. 7 exemplarily illustrates a high-level overview of the decision making process using a Gaussian estimation in accordance with another embodiment of the present invention.

FIG. 7 exemplarily illustrates a high-level overview of the decision making process using a Gaussian estimation module 200 in accordance with another embodiment of the present invention. A shown in FIG. 6 a measure of estimation error can be replaced by the variance resulting from the use of a gaussian process estimation process 200, in both a state space and a reward function. By analysing data, it can be observed physical phenomenon is more highly correlated within specific geographical areas. For example, in a Laboratory setting, sensors deployed closer to a window observe higher temperatures in comparison to sensors located in the middle of the room. A gaussian process 200 to more efficiently model correlation can be employed. Using a gaussian process 200 it is possible to use a kernel function, i.e., a covariance model, describing regions in which the information collected by sensors is more correlated. Additionally, metadata can be leveraged which helps to describe the correlation between sensors better.

In a system with sensors relying on energy harvesters the mechanism is capable of learning that sensor with an energy harvester can replenish its own energy. Note that this also requires to expend the aforementioned state space with the information regarding the sensors power type. For example '1' if it powered by an energy-harvester or '0' if it battery powered. Additionally, the rate with which a sensor replenishes its energy is unknown and depends on many external factors. Therefore, the mechanism is configured to learn that some sensors can replenish their energy, and others (battery-powered) do not. It is intuitively known in the system that the sensor with an energy harvester can transmit more often than the battery-powered sensors (when their energy levels are the same). The scheduling mechanism, on the other hand, has to experience a battery-powered sensor depleting its energy multiple times before it learns this. The mechanism can be trained over the entire life-cycle of the network numerous times before it will be able to learn the difference between a sensor with an energy harvester and a battery-powered sensor. Following such an approach, the scheduling mechanism can learn the desired behaviour.

In one embodiment the scheduling mechanism requires sufficient computation power and memory storage capacity. The Artificial Neural Network (ANN) training requires processing power, while storage is needed to save sensors' observations. It will be appreciated that the mechanism can be placed anywhere in the network. Deploying the mechanism closer to the sensors' location is preferred to improve performance.

Further, a person ordinarily skilled in the art will appreciate that the various illustrative logical/functional blocks, learning agents, artificial neural networks, modules, circuits, and process steps described in connection with the embodiments disclosed herein may be implemented as electronic hardware, or a combination of hardware and software. To clearly illustrate this interchangeability of hardware and a combination of hardware and software, various illustrative components, blocks, modules, circuits, and steps have been described above generally in terms of their functionality. Whether such functionality is implemented as hardware or a combination of hardware and software depends upon the design choice of a person ordinarily skilled in the art. Such skilled artisans may implement the described functionality in varying ways for each particular application, but such obvious design choices should not be interpreted as causing a departure from the scope of the present invention.

The process described in the present disclosure may be implemented using various means. For example, the apparatus described in the present disclosure may be implemented in hardware, firmware, software, or any combination thereof. For a hardware implementation, the processing units, or processors(s) or controller(s) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, software codes may be stored in a memory and executed by a processor. Memory may be implemented within the processor unit or external to the processor unit. As used herein the term "memory" refers to any type of volatile memory or non-volatile memory.

In the specification the terms "comprise, comprises, comprised and comprising" or any variation thereof and the terms include, includes, included and including" or any variation thereof are considered to be totally interchangeable and they should all be afforded the widest possible interpretation and vice versa.

A person skilled in the art would appreciate that the above invention provides a robust and economical solution to the problems identified in the prior art.

The invention is not limited to the embodiments hereinbefore described but may be varied in both construction and detail.

What is claimed is:
1. A method for energy aware scheduling for sensor devices, comprising:
    receiving one or more data packets from a first sensor device among said sensor devices, said sensor devices located in proximity of a location of interest, said one or more data packets comprising sensor data, said sensor data comprising sensor readings and energy available on said first sensor device;

transmitting a first sleep duration to said first sensor device, wherein said first sleep duration is based on a time of receipt of said one or more data packets from said first sensor device, a first estimation or measured error and said energy available on said first sensor device; and transmitting a second sleep duration to a second sensor device among said sensor devices;

wherein said first sleep duration and said second sleep duration are determined by an artificial neural network trained using a deep reinforcement learning technique, and wherein said artificial neural network determines said first sleep duration and said second sleep duration such that the first estimation or measured error and a second estimation or measured error does not exceed a predetermined threshold and energy utilized by said first sensor device and by said second sensor device is minimized and wherein said first sleep duration is greater than said second sleep duration and energy available on said second sensor device is greater that the energy available on the first sensor device.

2. The method of claim 1, further comprising receiving one or more data packets comprising sensor data from said second sensor device, said sensor data comprising sensor readings and energy available on said second sensor device.

3. The method of claim 1, wherein said second sleep duration is based on the time of receipt of said one or more data packets from said second sensor device, said second estimation or measured error and energy available on said second sensor device.

4. The method of claim 1, wherein said first estimation or measured error is based on said sensor readings received from said first sensor device and one or more previously received sensor reading from said sensor devices.

5. The method of claim 3, wherein said second estimation or measured error is based on said sensor readings received from said second sensor device and one or more previously received sensor reading from said sensor devices including said first sensor device.

6. A system for energy aware scheduling for sensor devices, comprising:

a transceiver operatively coupled to a processor, said processor configured for:

receiving one or more data packets from a first sensor device among said sensor devices, said sensor devices located in proximity of a location of interest, said one or more data packets comprising sensor data, said sensor data comprising sensor readings and energy available on said first sensor device;

transmitting a first sleep duration to said first sensor device, wherein said first sleep duration is based on a time of receipt of said one or more data packets from said first sensor device, a first estimation or measured error and said energy available on said first sensor device; and transmitting a second sleep duration to a second sensor device among said sensor devices;

wherein said first sleep duration and said second sleep duration are determined by an artificial neural network implemented by said processor, said artificial neural network trained using a deep reinforcement learning technique, and wherein said artificial neural network determines said first sleep duration and said second sleep duration such that the first estimation or measured error and a second estimation or measured error does not exceed a predetermined threshold and the energy utilized by said sensor devices is minimized and wherein said first sleep duration is greater than said second sleep duration and energy available on said second sensor device is greater that the energy available on the first sensor device.

7. The system of claim 6, said processor further configured for receiving one or more data packets comprising sensor data from said second sensor device, said sensor data from said second sensor device comprising sensor readings and energy available on said second sensor device.

8. The system of claim 6, wherein said second sleep duration is based on the time of receipt of said one or more data packets from said second sensor device, a second estimation or measured error and energy available on said second sensor device.

9. The system of claim 6, wherein said first estimation or said measured error is based on said sensor readings received from said first sensor device and one or more previously received sensor reading from said sensor devices.

10. The system of claim 8, wherein said second estimation or said measured error is based on said sensor readings received from said second sensor device and one or more previously received sensor reading from said sensor devices including said first sensor device.

* * * * *